INVENTOR.
WILLIAM POY JUE
BY Boyken & Mohler
ATTORNEY.

June 23, 1942. W. P. JUE 2,287,568
METHOD OF PRODUCING MOTION PICTURE FILM
ILLUSTRATING SURGICAL TECHNIQUE
Filed June 11, 1940 2 Sheets-Sheet 2

INVENTOR.
WILLIAM POY JUE
BY
Boyken & Mohler
ATTORNEY.

Patented June 23, 1942

2,287,568

UNITED STATES PATENT OFFICE 2,287,568

METHOD OF PRODUCING MOTION PICTURE FILM ILLUSTRATING SURGICAL TECHNIQUE

William Poy Jue, San Francisco, Calif.

Application June 11, 1940, Serial No. 339,894

4 Claims. (Cl. 35—17)

This invention relates to a new and improved method of producing a motion picture illustrating actual operative technique of any surgical procedure on the human body and has for its principal object a method of producing such picture by the combined use of drawings on suitable sheet material, such as paper, leather, rubber, etc., and actual operating steps performed by the operator on said material and photographing the successive stages of the operation so performed whereby the observer may clearly see every successive step performed from beginning to end and the exact surgical technique employed, without the interference usual where attempts have been made to film such steps during the actual operation on a human body. Other objects and advantages will appear in the following description.

Heretofore, in order to acquire knowledge of the finer points of surgery, a student of surgery has been compelled to make painstaking observations of operations by working for many years as assistant to a skilled surgeon. Even after such years have been spent, it is obvious that the knowledge acquired is limited by the nature of the actual cases coming under his observation. Attempts to shorten this time of study and to broaden the field, by the taking of motion pictures of operations, have been made. This latter method has been found to be impractical, since either the blood blotted out the site of operation or the operator, by necessity, frequently obscured the site in his movements. The total result of the taking of such pictures was a waste of many hundreds of feet of film and such pictures as were obtained, were mere fragments with no continuity. The use of text books in acquiring knowledge of surgical technique, it not a satisfactory substitute for actual observations. The method hereinafter described, results in a motion picture film for projection of the image thereon in the usual manner, and which film shows the surgical technique employed in an actual operation without interference by blood or the operator, and every step in the operation is clear and well defined.

The practice of producing animated motion pictures by taking a plurality of frames, with a motion picture camera, of drawings wherein changes in position or condition are shown, is old. My method also employs the use of a plurality of drawings illustrative of the progression of an operation insofar as the body, or organ, or the like, appears at successive stages in the operation, but between the substitutions of drawings of said stages, the actual manual steps of the operation are performed on the drawings while the drawings are successively photographed, whereby continuity between drawings is maintained at the running of the resultant film in a projector. Thus the animation is produced by coordination between the separate drawings as substituted, and the movement of the hands, or of the hands and instruments, of the operator in performing the steps of the operation on the drawings. The sheets of drawings being actually cut, sewed, etc., are, of course, mutilated, as the steps of the operation are performed, which differs from mere substitution of drawings and photographing the separate drawings.

The following explanation, together with the drawings, will explain my method, which method may, of course, be applied to any particular phase of surgery.

Figure 1:
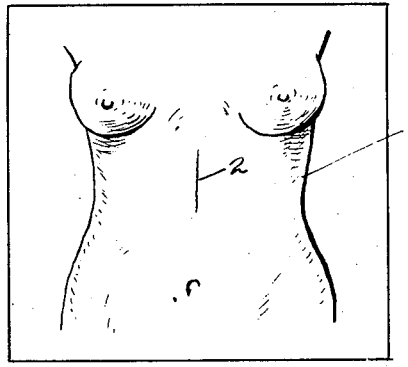
Figs. 1 to 6 represent drawings showing steps, in order, in an operation, the hand of the operator not being shown, but which hand and actual instruments would appear in the motion picture film.
Figure 2:
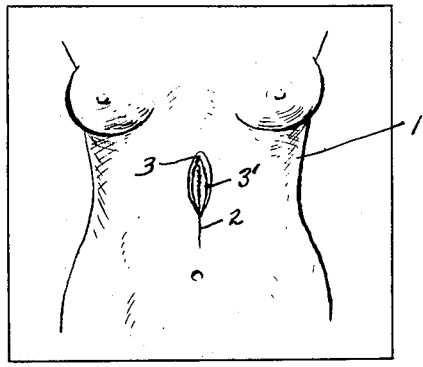
Figure 3:
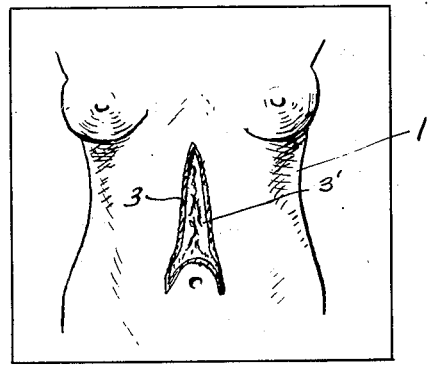
Figure 4:
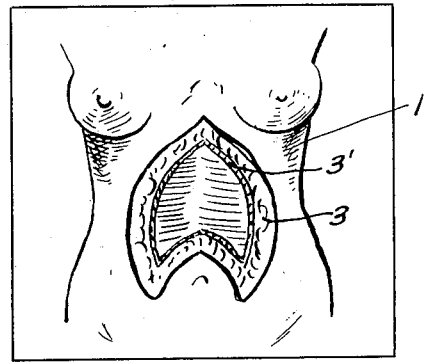

In Figs. 1 to 6 the portion of the body to be operated on is indicated at 1, on a sheet of material such as paper, leather, rubber, or the like. In Fig. 1, the drawing is photographed with a motion picture camera, and while the drawing is photographed, the operator actually makes the incision 2 in the drawing, the blade of the cutting instrument being inked so that the line of the cut will clearly register on the film. If desirable to show the opening of the incision during cutting, one or several drawings of the incision (Fig. 2), during progression of the cutting instrument, may be substituted. Thus, the separation of the tissues 3 is graphically indicated at 3' (Fig. 2). When the incision is complete, (Fig. 3) the outer layer of tissue, by a succession of drawings showing progressive stages, will ultimately reach the form shown in Fig. 4, at which stage the next step is the opening of the underlying tissues by actual incisions 4 (Fig. 5) effected in the same manner as in Figs. 1 to 3, the latter being made with an actual instrument in the hand of the operator.

If the sheet material is sufficiently flexible and tough, the actual spreading of the outer and under layers may be done by the hands of the operator, and suitable clamps, but successive drawings may be substituted to give the required animation and continuity, and to reveal the portions of the body that lie below the tissue that is spread.

Figure 5:
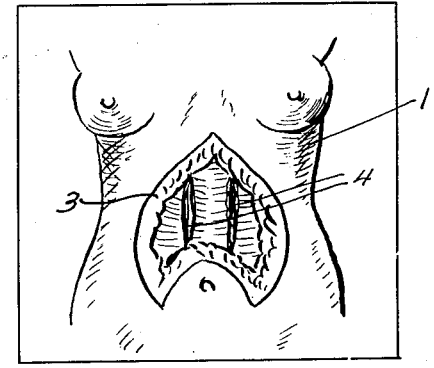
Figure 6:
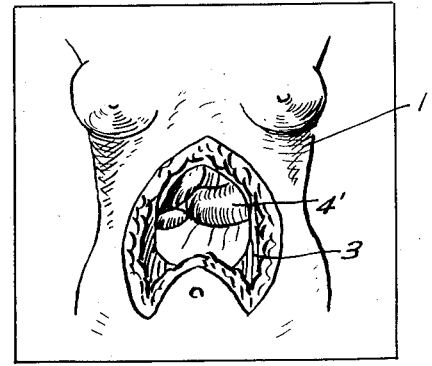

Between Fig. 5 and Fig. 6, a succession of drawings may form continuity of action in passing from the stage in Fig. 5 to the stage of Fig. 6, in which latter drawing the internal organs are revealed in position within the body. At this last stage (Fig. 6) the next steps in the operation are those which are performed on the particular internal organ or particular part of the body within the body cavity.

Figure 7:
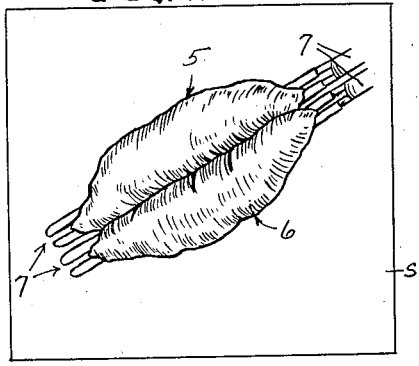
Figs. 7 to 10 are drawings showing steps, in order in an operation on organs within the body, the hand of the operator likewise being omitted.
Figure 8:
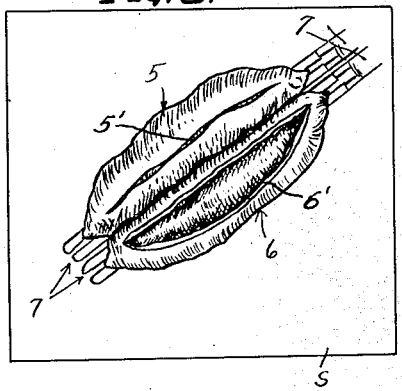

The illustration in Figs. 7 to 10 are believed sufficient to explain the next steps. Fig. 7 shows two parts, 5, 6 of the gastro intestinal tract clamped together by conventional clamps 7. All these representations are graphical, and not actual parts or models. Both parts 5, 6 are opened with a knife the same as described for Figs. 1 to 6, the manipulation of the knife and hand or hands of the operator being photographed in making the incisions.

Figure 9:
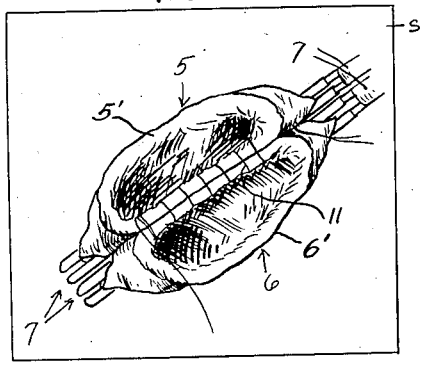

The adjacent sides 5′ and 6′ of parts 5, 6 respectively, are brought together with forceps, actual forceps and successive drawings, being used to show the accomplishment of this result until the stage in Fig. 9 is reached (except for the suture). The purpose of this operation is to anastomose the stomach opening (in part 5) to the intestinal opening (in part 6). This is called gastro-enterostomy. This operation is performed for curing or correcting the diseased condition of gastric or duodenal ulcers. It is merely making an additional opening in the stomach, to the intestine, so as to form a new passageway from the stomach to the intestine, whereby the diseased portion of the stomach or intestine is removed from the irritating effect of food that would normally follow the original passageway, and over the diseased portion.

Figure 11:
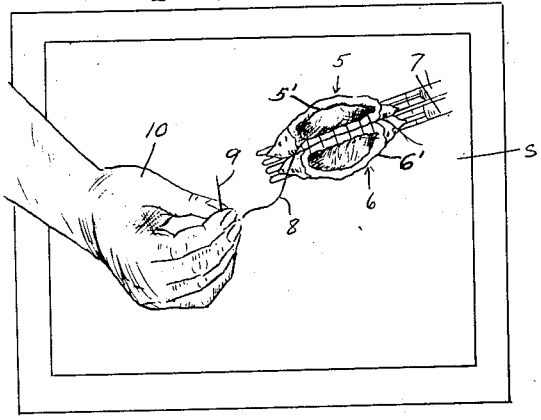
Fig. 11 shows the hand of the operator and a suture, with respect to say, Fig. 9, which illustrates that which would appear in the motion picture film at that particular stage in the operation.
Figure 12:
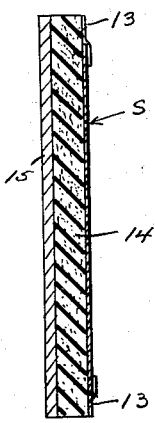
Fig. 12 is a vertical sectional view through one of the drawings showing the soft support for the drawing so as to facilitate use of a suture etc.

After the stage illustrated in Fig. 9 (except for the suture) is reached, the operator, having a real suture 8 and needle 9 in his hand 10 (Fig. 11) performs the sewing together of the cut edges of the parts 5, 6.

Figure 10:
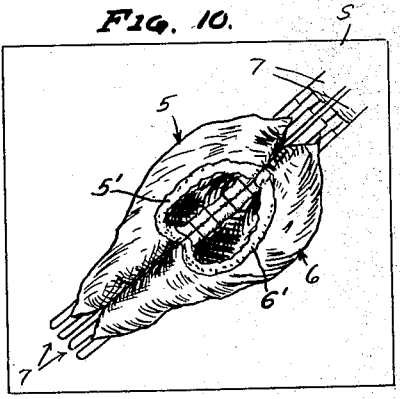

In Fig. 9, the drawing shows the parts connected, and the suture itself may be graphically illustrated at 11 after this stage is reached. By a succession of drawings, one of which is indicated in Fig. 10, and manipulation of the real suture and needle, the parts 5, 6 will be fully connected. After the needle and suture is drawn through one drawing, by the hand of the operator, another drawing may be substituted showing the edges of parts 5, 6 drawn just that much closer together, until the operation is completed.

During the manual manipulation on each sheet, the latter, designated S, may be supported by transparent tape 12 (Fig. 13) or any other suitable means, on a mat 14 of soft material, preferably sponge rubber or other fairly resilient material, which mat may be secured to a rigid support 15. The sheet so secured, is preferably of a size to enable a clear picture to be taken of the hand 10 of the operator, as well as the instruments used, such as a knife, clamps, or the suture 8 and needle 9, as the case may be.

The source of illumination during the taking of the pictures is positioned so that undesirable shadows are eliminated and, of course, the drawings of the body or organs, or other part of the body, are preferably life size, so that the hand of the operator and the instruments used, will be correctly proportioned to the part illustrated.

As has already been stated, the material of the sheets carrying the drawings, may be of leather, such as chamois, surfaced on one side to facilitate drawing or printing thereon, or artificial leather, or rubber, or even paper may be used. A fairly tough material eliminates the chance of accidentally mutilating the material, and in sewing, cutting or spreading of the same, the material reacts in a manner more nearly like actual body tissue.

It is thought obvious that by my method, full control is had of every phase of the operation with respect to the clarity with which the film reproduces the action and drawing. The shading of the drawing is made so as not to obscure any important portions of the body, and certain parts may be emphasized while others may be subdued. Obviously, the drawing may be as elaborate as is desired. Phantom views may be employed if desired, or sectional views, etc. The fundamentals will remain the same, namely, the actual manual operations on graphic representations of the part upon which the operation is being performed, all so combined as to show a motion picture without substantial breaks in the continuity.

In portraying operations on the head or where bone surgery is involved, it is, of course, obvious that hard material with a planar surface may be used instead of flexible material, and the drawings made on the flat surface of such material, so shaded as to simulate three dimensions. The actual operation is then performed on such material with the correct instruments for the particular operation. The scope of the claims is intended to cover such material, except where flexible material is specified.

Having described my invention, I claim:

1. The method of producing a motion picture film of a surgical operation that comprises the steps of photographing successive appearances of a portion of the body that are graphically portrayed on separate sheets of material in which said appearances so portrayed are illustrative of successive stages of such operation, and, during said photographing, manually performing the steps of the operation on each sheet necessary to produce continuity of action between said successive appearances and to show the actual surgical technique employed in performing the operation.

2. The method of producing a motion picture film illustrating the surgical technique employed in performing a surgical operation that includes the steps of manually performing actual steps of the operation on sheets of material on which are graphically portrayed the portion of the body on which the operation is to be performed at different successive stages of the operation, the said manually performed steps including actually manipulating the sheet as by cutting and sewing with actual instruments, and the said manually performed steps being those required to produce continuity in the photographic record between the different stages portrayed by said sheets.

3. The method of producing a motion picture film illustrating the surgical technique employed in performing a surgical operation that comprises the steps of first photographing a drawing illustrative of the portion of the body on which one step of the operation is to be performed, and at the same time manually performing one stage of said operation on said sheet at the desired location on the drawing thereon, thereafter photographing a drawing on a second sheet in which the said portion is illustrated at the completion of said one stage and at the same time manually performing the next successive stage of said operation on said sheet, and repeating the photographing of additional drawings illustrating successive stages of said operation and at the same time performing on each successive sheet the actual steps of the operation necessary for producing continuity of operative action between the successive stages illustrated on the sheets.

4. In the method as defined in claim 3, yieldably supporting said sheets during the manual performance of the operation thereon to enable manipulation of the sheets in a manner generally simulating the yieldability of the portion of the body portrayed on said sheet whereby the manual performance of the operation, such as the manipulation of a suture and thread, will approximate the realism of an actual operation on a human body.

WILLIAM POY JUE.